(12) United States Patent
Ober

(10) Patent No.: US 6,453,415 B1
(45) Date of Patent: Sep. 17, 2002

(54) METHOD OF COMMUNICATING SECURELY BETWEEN AN APPLICATION PROGRAM AND A SECURE KERNEL

(75) Inventor: Timothy Ober, Atkinson, NH (US)

(73) Assignee: SafeNet, Inc., Baltimore, MD (US)

( * ) Notice: Subject to any disclaimer, the term of this patent is extended or adjusted under 35 U.S.C. 154(b) by 0 days.

(21) Appl. No.: 09/154,228

(22) Filed: Sep. 16, 1998

Related U.S. Application Data

(60) Provisional application No. 60/059,082, filed on Sep. 16, 1997, and provisional application No. 60/059,840, filed on Sep. 16, 1997.

(51) Int. Cl.[7] .................................................. H04L 9/00
(52) U.S. Cl. ........................................................ 713/165
(58) Field of Search .............................. 713/165, 164, 713/200; 712/227, 244

(56) References Cited

U.S. PATENT DOCUMENTS

| | | | |
|---|---|---|---|
| 4,987,595 A | 1/1991 | Marino, Jr. et al. | |
| 5,530,758 A | * 6/1996 | Marino, Jr. et al. | 713/150 |
| 5,557,346 A | 9/1996 | Lipner et al. | |
| 5,623,545 A | 4/1997 | Childs et al. | |
| 5,631,960 A | 5/1997 | Likens et al. | |
| 5,721,777 A | 2/1998 | Blaze | |
| 5,790,846 A | * 8/1998 | Mealey et al. | 712/244 |

* cited by examiner

Primary Examiner—Matthew B. Smithers
(74) Attorney, Agent, or Firm—Hoffmann & Baron, LLP

(57) ABSTRACT

A method of communicating securely between an application program and a secure kernel is performed by passing command requests and arguments between the application program and the secure kernel through a kernel block memory and a command block memory so that security intensive and real time intensive applications can co-exist without a security breach. The secure kernel retrieves the command requests and the arguments from an application program data memory and processes the information within the secure kernel. The secure kernel returns the processed data to the application program. All data transfers are under control of the secure kernel software, and thus numerous 'active attacks' against the security of the system are defeated.

1 Claim, 2 Drawing Sheets

METHOD OF COMMUNICATING SECURELY BETWEEN AN APPLICATION PROGRAM AND A SECURE KERNEL

CROSS-REFERENCE TO RELATED APPLICATIONS

This application is based on Provisional Patent Application Serial Nos. 60/059,082, and 60/059,840, each of which was filed on Sep. 16, 1997, and relates to U.S. patent application entitled "Cryptographic Co-Processor" filed concurrently herewith, the disclosures of which are incorporated herein by reference.

BACKGROUND OF THE INVENTION

1. Field of the Invention

The present invention relates generally to a method of communicating securely between an application program and a secure kernel, and more particularly relates to a method of passing command requests and arguments between an application program and a secure kernel so that security intensive and real time intensive applications can coexist without a security breach.

2. Description of the Prior Art

Passing software structures such as data and commands between subroutines within a program is known in the art. Software is typically created in a modular form where each module communicates with each other by passing information back and forth. Software pointers and hardware resters to locate data within a program are also commonly used. Calling subroutines and jumping from one software module to another module are also known in the art. These software techniques are applied to all types of application programs including secure communication programs. However, these application programs do not have distinct boundaries between the software modules and the security software modules. An application program may be permitted to enter a secure program area. There are software techniques to implement this process in a secure manner. However, it can never be truly secure because once an application program command structure or data structure is permitted to enter a secure program module, the application program module is free to do whatever a programmer instructs it to do, such as retrieve secret cryptographic keys.

OBJECTS AND SUMMARY OF THE INVENTION

It is an object of the present invention to provide a method of communicating securely between an application program and a secure kernel.

A method of securely communicating between an application program and a secure kernel that contains cryptographic algorithms includes the step of creating a memory storage area for storing and reading command requests, command data and status data. The address of the memory storage area is passed to the secure kernel. The secure kernel proceeds to bring in only the information within the memory storage area that it deems is necessary and the application program is not permitted to enter the secure kernel. The secure kernel processes the information retrieved, using cryptographic algorithms located within the secure kernel and transfers results back to the kernel block where the application program can retrieve them.

Since all data transfers across the boundary between the application program and the secure kernel are initiated by the kernel, a high degree of protection is afforded against attacks such as: trojan horse, illicit commands, virus, etc. The kernel is always fully in control of the commands and data it processes.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
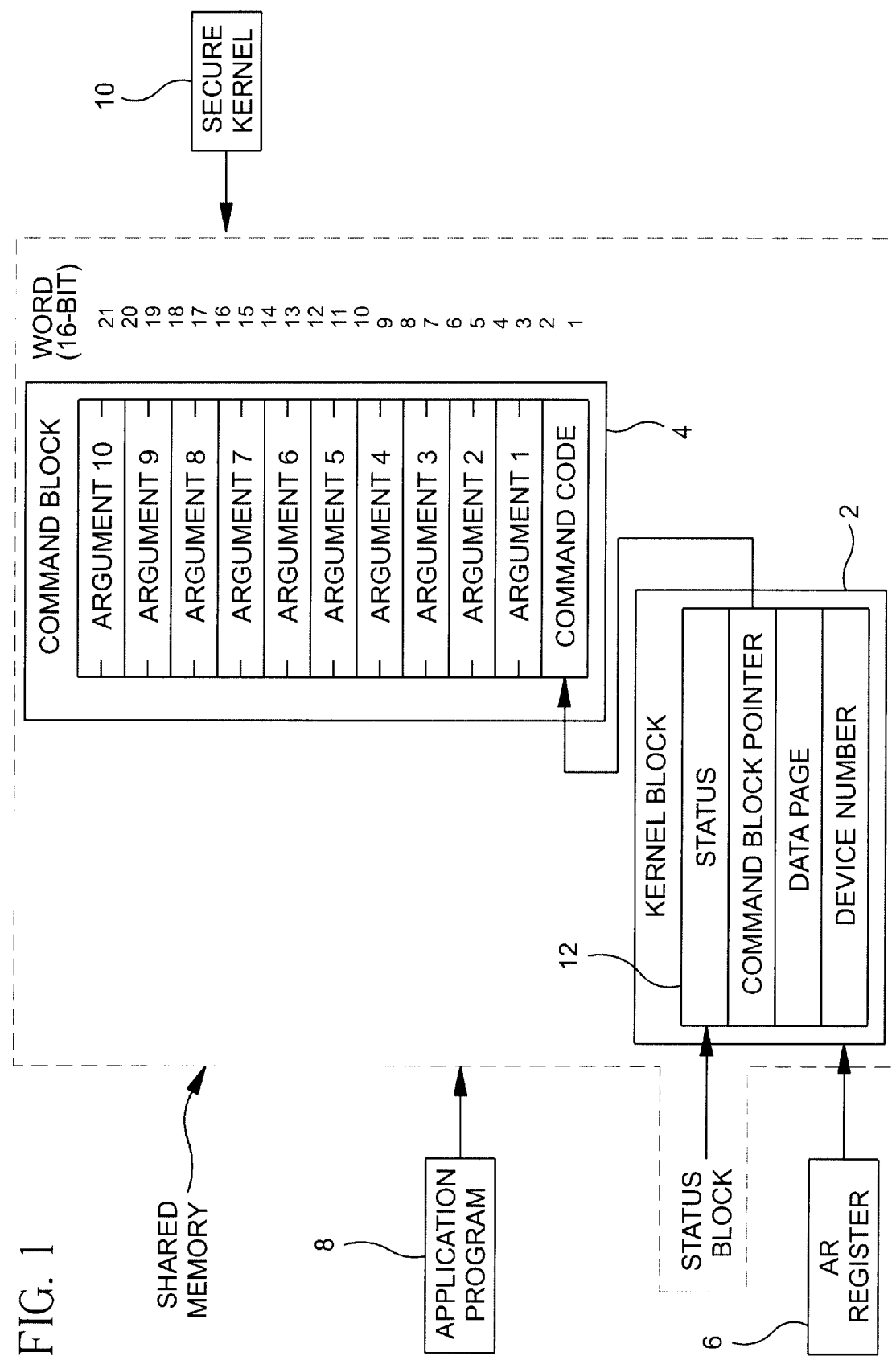
FIG. 1 is a block diagram of portions of an integrated circuit having secure and unprotected memory areas used for securely communicating between an application program and a secure kernel in the integrated circuit in accordance with the present invention.

In accordance with one form of the present invention, and as shown in FIG. 1, an integrated circuit, preferably a cryptographic co-processor such as that disclosed in U.S. Patent Application entitled "Cryptographic Co-Processor", the disclosure of which is incorporated herein by reference, includes a kernel block memory structure 2, a command block memory structure 4 and a register 6 which together provide a boundary between an application program 8 and a secure kernel 10, which includes cryptographic algorithms and commands. All communications between the application program 8 and the secure kernel 10 are through the kernel block memory 2 and the command block memory structure 4. The kernel block 2 and the command block 4 are used by the application program and the secure kernel to transfer command communications between the application program and the secure kernel. The kernel block 2 and command block 4 store command codes, arguments, and status and pointer information. Together, the kernel and command blocks occupy a pre-formatted shared block of random access memory (RAM) located in either an internal data memory or an external data memory.

The application program 8 stores the required cryptographic commands and arguments in the command block memory 4. They are stored in this separate area of memory because the application program is not permitted to directly enter the secure kernel 10. The commands are tools which allow the application software to control and manipulate the cryptographic algorithms located within the secure kernel 10. The arguments are the data which is passed between the application program 8 and the cryptographic algorithms. The command block memory structure 4 is used as a data transfer area between the application program 8 and the secure kernel 10 for servicing cryptographic commands.

Figure 2:
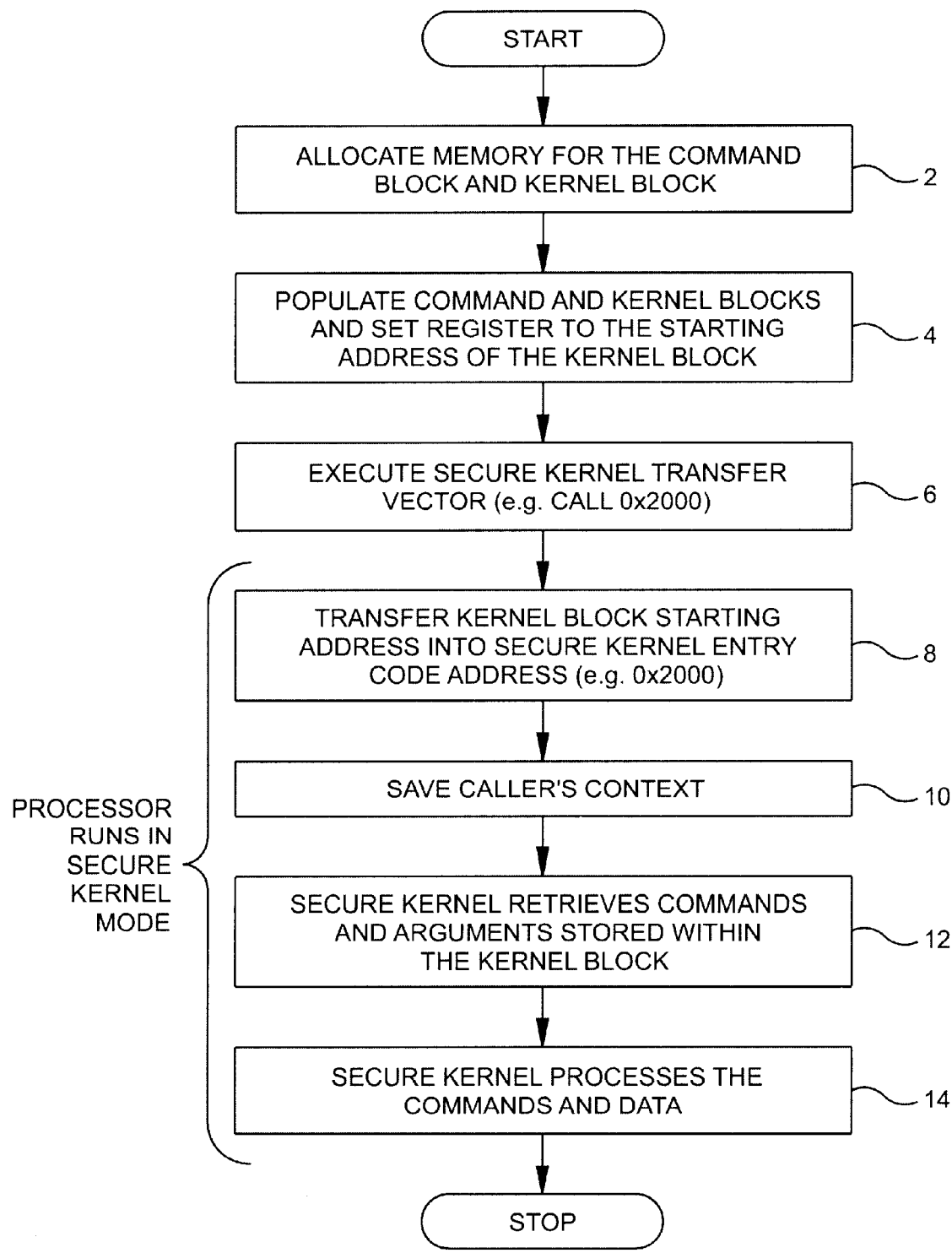
FIG. 2 is a flowchart of the method of passing command requests and arguments between an application program and a secure kernel in accordance with the present invention.

Preferably, the kernel block 2 includes a status block field 12. The status block field 12 provides the application program 8 with the means to track the status of the secure kernel 10 (e.g. active or idle) and a means to determine the result of a requested cryptographic service. As shown in the flowchart of FIG. 2, the application program first sets up the kernel block 2 and command block 4, preferably allocating 21 16 bit words of RAM for the command block 4 and 4 16 bit words of RAM for the kernel block 2 (Block 2).

The register 6 stores the starting address location of the kernel block 2 so that the secure kernel 10 can locate the kernel block memory 2 at a later time. The command block memory 4 and the kernel block memory 2 can be located anywhere within the processor's data memory. However, the starting address of the kernel block memory 2 should be stored in the register 6.

The command block memory 4 and kernel block memory 2 may be populated with the desired command and data (Block 4). The starting address of the kernel block 2 is stored in the register 6. To execute a cryptographic service, the application program 8 must explicitly invoke the secure kernel 10. Invoking the secure kernel 10 is achieved by executing a secure kernel transfer vector (e.g., call 0x2000 instruction).

Using the call (i.e., command) instruction (e.g., call 0x2000), the application program 8 relinquishes processor control to the secure kernel's read only memory (ROM) encoded program (Block 6). Address 0x2000 is preferably the only entry point of the secure kernel 10. The starting address of the kernel block memory 2 is located in the register 6 which is passed into the secure kernel 10 (Block 8). The secure kernel 10 uses the address to locate and then retrieve the kernel block memory information. The kernel block memory information contains a pointer to a command address where the command block is stored. The secure kernel 10 proceeds to save the caller's context (application program context) in a memory stack (Block 10). This preferably involves saving the caller's program counter (PC) return address, stack pointer, and frame pointer. Once the context has been saved, the secure kernel 10 points to the data memory address where the kernel block memory 2 is stored and proceeds by retrieving the commands and arguments stored within the kernel block 2 and command block 4 (Block 12). The secure kernel 10 processes the commands and data using the cryptographic algorithms and commands (Block 14). It then transfers the processed information back to specified locations in data memory and updates the status field in the kernel block 2, at which point the application program 8 can now access the processed information.

Although illustrative embodiments of the present invention have been described with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of securely communicating between an application program and a secure kernel of an integrated circuit, the secure kernel having stored therein cryptographic algorithms, the integrated circuit further having a register, a command block memory and a kernel block memory, which comprises the steps of:

storing m the register of the integrated circuit the address of the kernel block memory;

reading by the secure kernel the contents of the kernel block memory at the address in the register, the kernel block memory being accessible to the application program and the secure kernel, the contents of the kernel block memory at the address in the register containing at least one pointer address corresponding to a memory location in the command block memory, the command block memory being accessible to the application program and the secure kernel; and fetching by the secure kernel the contents of the memory location of the command block memory corresponding to the at least one pointer address, the contents of the memory location including at least one of a command and an argument, thereby enabling secure communication between the application program and the secure kernel without the application program directly accessing the secure kernel.

* * * * *